United States Patent
Sugihara et al.

(10) Patent No.: US 9,777,085 B2
(45) Date of Patent: Oct. 3, 2017

(54) METHOD FOR PRODUCING HOMOPOLYMER OR RANDOM COPOLYMER OF HYDROXYL GROUP-CONTAINING VINYL ETHER

(71) Applicant: MARUZEN PETROCHEMICAL CO., LTD., Tokyo (JP)

(72) Inventors: Shinji Sugihara, Fukui (JP); Tomohiro Masukawa, Ichihara (JP)

(73) Assignee: Maruzen Petrochemical Co., Ltd., Chuo-Ku, Tokyo-To (JP)

( * ) Notice: Subject to any disclaimer, the term of this patent is extended or adjusted under 35 U.S.C. 154(b) by 0 days.

(21) Appl. No.: 14/378,155

(22) PCT Filed: Feb. 4, 2013

(86) PCT No.: PCT/JP2013/052473
§ 371 (c)(1),
(2) Date: Aug. 12, 2014

(87) PCT Pub. No.: WO2013/121910
PCT Pub. Date: Aug. 22, 2013

(65) Prior Publication Data
US 2015/0005467 A1 Jan. 1, 2015

(30) Foreign Application Priority Data
Feb. 14, 2012 (JP) ................. 2012-029821

(51) Int. Cl.
| C08F 116/16 | (2006.01) |
|---|---|
| C08F 116/18 | (2006.01) |
| C08F 116/14 | (2006.01) |
| C08F 16/26 | (2006.01) |
| C08F 216/14 | (2006.01) |
| C08F 216/20 | (2006.01) |

(52) U.S. Cl.
CPC ............ *C08F 116/14* (2013.01); *C08F 16/26* (2013.01); *C08F 216/1416* (2013.01); *C08F 216/20* (2013.01)

(58) Field of Classification Search
CPC .... C08F 116/14; C08F 116/20; C08F 216/20; C08F 216/1416; C08F 16/26
See application file for complete search history.

(56) References Cited

U.S. PATENT DOCUMENTS

| 3,328,468 A | 6/1967 | Nowak |
|---|---|---|
| 5,187,201 A | 2/1993 | Haubennestel et al. |
| 5,514,288 A | 5/1996 | Holland et al. |
| 5,576,407 A * | 11/1996 | Kroner ................ C11D 3/3711 526/307.5 |
| 6,384,170 B1 | 5/2002 | Krull et al. |
| 6,391,071 B1 | 5/2002 | Krull et al. |
| 2011/0091727 A1 | 4/2011 | Joehnck et al. |
| 2014/0155565 A1 | 6/2014 | Joehnck et al. |

FOREIGN PATENT DOCUMENTS

| EP | 2 159 261 A1 | 3/2010 |
|---|---|---|
| JP | 58-136662 A1 | 8/1983 |
| JP | 06-263824 A1 | 9/1994 |
| JP | 06-511021 A1 | 12/1994 |
| JP | 11-335420 A1 | 12/1999 |
| JP | 2003-503541 A1 | 1/2003 |
| JP | 2004-189986 A1 | 7/2004 |
| JP | 2004-211034 A1 | 7/2004 |
| JP | 2004189986 A * | 7/2004 |
| JP | 2011-012147 A1 | 1/2011 |
| JP | 2011-012227 A1 | 1/2011 |
| JP | 2011-012232 A1 | 1/2011 |
| JP | 2011-021141 A1 | 2/2011 |
| JP | 2011-179074 A1 | 9/2011 |
| JP | 2012-229346 A1 | 11/2012 |
| WO | 2007/014591 A1 | 2/2007 |

OTHER PUBLICATIONS

Japanese Office Action (Application No. 2012-029821) dated Sep. 15, 2015.
International Preliminary Report on Patentability (Application No. PCT/JP2013/052473) dated Aug. 28, 2014.
Sugihara, S., et al. "Thermosensitive Polyalcohols: Synthesis via Living Cationic Polymerization of Vinyl Ethers with a Silyoxy Group," *Journal of Polymer Science*, vol. 41 (2003), pp. 3300-3312.
Kumagai, T., et al. "Specific Polymerization Mechanism Involving β-Scission of Mid-Chain Radical Yielding Oligomers in the Free-Radical Polymerization of Vinyl Ethers," *Macromolecules*, vol. 41, Sep. 20, 2008, pp. 7347-7351.
Miyamoto, M., et al. "Radical Polymerization of Oligoethylene Glycol Methyl Vinyl Ethers in Protic Polar Solvents," *Macromolecular Chemistry and Physics*, vol. 199, No. 1, (1998), pp. 119-125.
International Search Report (Application No. PCT/JP2013/052473) dated Apr. 23, 2013 (with English translation).
Extended European Search Report (Application No. 13748652.8) dated Oct. 14, 2015.
Taiwanese Office Action (Application No. 102105604) dated Jun. 4, 2016.

* cited by examiner

*Primary Examiner* — Karuna P Reddy
(74) *Attorney, Agent, or Firm* — Burr & Brown, PLLC

(57) ABSTRACT

A method of producing a homopolymer or random copolymer of hydroxyl group-containing vinyl ether by polymerizing a monomer component comprising at least one hydroxyl group-containing vinyl ether using an oil-soluble radical polymerization initiator in the absence or presence of a solvent.

9 Claims, No Drawings

METHOD FOR PRODUCING HOMOPOLYMER OR RANDOM COPOLYMER OF HYDROXYL GROUP-CONTAINING VINYL ETHER

TECHNICAL FIELD

The present invention relates to a method of producing a vinyl ether (co)polymer having a hydroxyl group simply and conveniently. More specifically, the present invention relates to a method of producing a hydroxyl group-containing vinyl ether (co)polymer simply and conveniently by carrying out radical polymerization without protecting hydroxyl groups of the hydroxy vinyl ether.

BACKGROUND ART

Hydroxyl group-containing vinyl ether (co)polymers are excellent in adhesion with a substrate and processability via a cross-linking reaction with various resins, and are useful as resin modifiers, paint components, ink components, adhesive components, metal recovery resins, hygroscopic materials, compatibilizers, surfactants, or the like. For instance, Patent Document 1 discloses, as a vinyl ether copolymer suitable for an adhesive composition, a random copolymer composed of a propyl vinyl ether unit and diethylene glycol vinyl ether unit.

Further, as shown in Non-patent Document 1, it has been known that hydroxyl group-containing vinyl ether (co)polymers exhibit responsiveness to thermal stimulation. Thermal stimulation responsive polymers have the characteristics of reversibly altering the solubility to water, that is, hydrophilicity and hydrophobicity, below and above a certain temperature; and thus use of this in a member component allows for switching the hydrophilicity and hydrophobicity of the member component by temperature. Further, by making the copolymer as one with vinyl ether having various functional groups, it is expected to obtain materials capable of controlling various functions depending on the temperature. Copolymers with hydrophobic monomers, in particular, greatly affect interaction with hydrophobic substances and are suitable to be used in a system responsive to temperature stimulation.

Incidentally, cationic polymerization is known to progress because the vinyl ether monomer is a monomer having an electron-donating substituent as its property. However, because the hydroxyl group induces a termination reaction for a cationic polymerization catalyst, in cases where a vinyl ether (co)polymer containing the hydroxyl group is obtained by the cationic polymerization, monomers with the hydroxyl group being protected are polymerized and thereafter the step of deprotection is carried out (see, for example, Patent Document 1 and Non-patent Document 1). Further, the cationic polymerization is usually carried out under low temperatures equal to or less than 0° C.; and, because of heat of the reaction, it is not easy to control the temperature in an industrial scale. In addition, the reaction is required to be carried out in an anhydrous condition and inert gas. It has therefore been difficult to industrially produce the hydroxyl group-containing vinyl ether (co)polymer via the cationic polymerization at low cost in an efficient fashion.

Meanwhile, vinyl ether is known to exhibit alternating copolymerizability with a strong electron accepting monomer; and an alternating copolymer in which the vinyl ether is introduced appropriately 50 mol% can be readily obtained, for example, by subjecting the vinyl ether and fluoroolefin to radical polymerization at a molar ratio of 1:1. That is, according to a method of alternating copolymerization with fluoroolefin, a copolymer containing a hydroxyl group can be obtained by using hydroxyl group-containing vinyl ether as is in polymerization (see, for example, Patent Documents 2 and 3).

However, because the vinyl ether exhibits, when used alone, a low radical polymerization reactivity, radical polymerization hardly ever progressed and an oligomer cannot be obtained even if the reaction takes place (see, for example, Non-patent Document 2). Due to this, it has been difficult to obtain a vinyl ether (co)polymer containing a hydroxyl group by the radical polymerization using the vinyl ether alone as a monomer.

On the contrary, Non-patent Document 3 reports that, with regard to oligoethylene glycol methyl vinyl ether, the electron density of radical chain propagation carbon can be lowered by carrying out polymerization in water, ethanol, or a water/ethanol mixed solvent in the presence of a water-soluble radical polymerization initiator containing an amidino group, thereby allowing radical polymerization to progress. It is however shown that, in cases where 2,2'-azobisisobutyronitrile (AIBN) which is hardly soluble in water is used as a polymerization initiator, the reaction hardly progresses. Further, the monomers used in the reaction are all hydrophilic, the polymerization initiator is water soluble, and the solvent used is also water or one that contains water. Thus, such a reaction is disadvantageous for introducing hydrophobic monomers.

PRIOR ART REFERENCES

Patent Documents

[Patent Document 1] Japanese Patent Application Laid-Open Publication No. 2011-12147
[Patent Document 2] Japanese Patent Application Laid-Open Publication No. 58-136662
[Patent Document 3] Japanese Patent Application Laid-Open Publication No. 2004-189986

Non-Patent Documents

[Non-patent Document 1] J. Polym. Sci. PartA. Polym. Chem. 41, 3300, 2003.
[Non-patent Document 2] Macromolecules, 41, 7347, 2008.
[Non-patent Document 3] Macromol. Chem. Phys. 199, 119, 1998.

SUMMARY OF THE INVENTION

Problems to be Solved by the Invention

An object of the present invention is to provide a method of producing a hydroxyl group-containing vinyl ether (co) polymer, the method of production comprising (co)polymerizing mainly vinyl ether (or only vinyl ether) as a monomer component, being capable of introducing a hydroxyl group even with steps such as deprotection not being required, and being capable of copolymerizing with a hydrophilic monomer as well as a hydrophobic monomer.

Further, according to the present inventors' examination, as shown in the comparative examples described later, it was proven that in cases where polymerization of hydroxyl group-containing vinyl ether using a water-soluble polymerization initiator, polyacetal was generated and a hydroxyl group-containing vinyl ether (co)polymer could not be quantitatively obtained. Therefore, an object of the present invention is, in addition to the above, to provide a method of production that is capable of inhibiting the generation of polyacetal and obtaining the hydroxyl group-containing vinyl ether (co)polymer in high yield.

Means for Solving the Problems

In order to attain the above object, the present inventors intensively studied to find that radical polymerization of a monomer component containing a hydroxyl group-containing vinyl ether using a particular polymerization initiator, contrary to conventional knowledge, made it possible to obtain a hydroxyl group-containing vinyl ether polymer with high molecular weight in high yield and, even in cases where copolymerization was carried out with another other vinyl ether, a random copolymer can be efficiently obtained. Further, the inventors have found that, by using an organic solvent containing a water-soluble organic solvent such as alcohol as a polymerization solvent, an intended homopolymer or random copolymer of vinyl ether can be more efficiently obtained, thereby completing the present invention.

That is, according to one mode of the present invention, provided is a method of producing a homopolymer or a random copolymer of a hydroxyl group-containing vinyl ether, the method of production comprising the step of polymerizing, using an oil-soluble radical polymerization initiator in the absence or presence of a solvent, a monomer component comprising at least one hydroxyl group-containing vinyl ether represented by the following formula (1):

$$CH_2=CH-O-R^1(-OH)_n \quad (1)$$

wherein R1 represents an aliphatic hydrocarbon group having 1 to 10 carbon atoms or an alkoxy alkyl group having 3 to 7 carbon atoms, is optionally branched and optionally comprises a cyclic structure; and n is 1 to 5.

In accordance with the mode of the present invention, it is preferred that the above monomer component further comprise at least one vinyl ether represented by the following formula (2):

$$CH_2=CH-O-R^2 \quad (2)$$

wherein R2 represents an aliphatic hydrocarbon group having 2 to 20 carbon atoms, is optionally branched and optionally comprises a cyclic structure;
or the following formula (3):

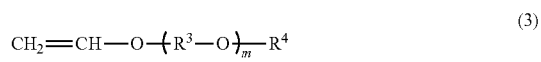

$$CH_2=CH-O-(R^3-O)_m-R^4 \quad (3)$$

wherein R3 represents a linear or branched hydrocarbon group having 1 to 4 carbon atoms; R4 represents a methyl group or an ethyl group; and m is 1 to 5.

In accordance with the mode of the present invention, it is preferred that the above oil-soluble radical polymerization initiator be an organic peroxide or an organic azo compound.

In accordance with the mode of the present invention, it is preferred that the above homopolymer or random copolymer have a weight average molecular weight (Mw) within the range of 1000 to 100000.

In accordance with the mode of the present invention, it is preferred that the content of polyacetal in the above homopolymer or random copolymer be not more than 10% by weight.

In accordance with the mode of the present invention, it is preferred that the above solvent be an organic solvent comprising at least one water-soluble organic solvent.

In accordance with the mode of the present invention, it is preferred that the above water-soluble organic solvent be selected from the group consisting of alcohol, alkyl amide, alkyl sulfoxide and ketone.

Effect of the Invention

The method of production according to the present invention does not require protection of a hydroxyl group and deprotection step, is capable of inhibiting generation of polyacetal by carrying out polymerization using a particular polymerization initiator, and is capable of efficiently producing a homopolymer or a random copolymer of hydroxyl group-containing vinyl ether.

In addition, the method of production of the present invention is capable of randomly copolymerizing hydroxyl group-containing vinyl ether with hydrophobic vinyl ether or hydrophilic vinyl ether via radical polymerization, and is capable of efficiently producing a random copolymer usable in various applications.

DETAILED DESCRIPTION OF THE INVENTION

The method of producing a vinyl ether (co)polymer according to the present invention is characterized by polymerizing monomer components in the presence of a particular polymerization initiator, which monomer component comprises vinyl ether containing n number of hydroxyl groups represented by the above formula (1). The present invention will be described in detail below.

Monomer Component

A monomer component used in the method of producing a vinyl ether (co)polymer according to the present invention comprises, as an essential component, at least one type of hydroxyl group-containing vinyl ether represented by the following formula (1):

$$CH_2=CH-O-R^1(-OH)_n \quad (1)$$

wherein, $R^1$ represents an aliphatic hydrocarbon group having 1 to 10 carbon atoms or an alkoxy alkyl group having 3 to 7 carbon atoms; and may be branched or may contain a cyclic structure; and n is 1 to 5. In the formula (1), the number of the hydroxyl groups, n, is within the range of 1 to 5, preferably in a range of 1 to 3, and in particular preferably 1.

In the formula (1), examples of the aliphatic hydrocarbon group having 1 to 10 carbon atoms represented by $R^1$ include n+1 valent alkyl groups having 1 to 10 carbon atoms or n+1 valent alicyclic hydrocarbon groups having 5 to 10 carbon atoms.

Examples of the n+1 valent alkyl group having 1 to 10 carbon atoms include groups obtained by taking out n+1 number of hydrogen atoms from linear or branched alkanes such as methane, ethane, propane, n-butane, n-pentane, n-hexane, isobutane, isopentane, and neopentane.

Examples of the n+1 valent alicyclic hydrocarbon group having 5 to 10 carbon atoms include groups obtained by taking out n+1 number of hydrogen atoms from monocyclic or polycyclic cycloalkanes having 5 to 10 carbon atoms or an alkyl substitution product thereof. The hydrogen atom that is taken out may be one in cycloalkane or may be one in the added alkyl group. Concrete examples thereof include groups obtained by taking out n+1 number of hydrogen atoms from monocycloalkane such as cyclopentane and cyclohexane, and an alkyl substitution product thereof; and groups obtained by taking out n+1 number of hydrogen atoms from poly cycloalkane such as adamantane, norbornane, isobornane, tricyclo[5.2.1.0$^{2,6}$]decane, and decahydronaphthalene, and an alkyl substitution product thereof.

Examples of the alkyl group added to cycloalkane include alkyl groups having 1 to 5 carbon atoms; and concrete examples thereof include a methyl group, ethyl group, n-propyl group, isopropyl group, n-butyl group, sec-butyl group, tert-butyl group, n-pentyl group, neopentyl group, and isoamyl group. The number of the substituent is not limited to 1; and in cases where plural substituents are present, they may be the same or may be different.

Further, in the formula (1), examples of the alkoxy alkyl group having 3 to 7 carbon atoms represented by $R^1$ include a group obtained by taking out n+1 number of hydrogen atoms from a linear, branched, or cyclic ether having 3 to 7 carbon atoms. Concrete examples thereof include groups obtained by taking out n+1 number of hydrogen atoms from linear or branched ether such as methyl ethyl ether, diethyl ether, methyl propyl ether, methyl isopropyl ether, ethyl propyl ether, ethyl isopropyl ether, methyl butyl ether, ethyl butyl ether, methyl sec-butyl ether, ethyl sec-butyl ether, methyl tert-butyl ether, and ethyl tert-butyl ether; and groups obtained by taking out n+1 number of hydrogen atoms from cyclic ether such as tetrahydrofuran and tetrahydropyran.

Of these, a n+1 valent alkyl group having 1 to 10 carbon atoms is preferred and a divalent (n=1) linear alkyl group (alkylene group) having 1 to 6 carbon atoms is in particular preferred. Concrete examples thereof include methylene group (—CH$_2$—), ethylene group (—CH$_2$CH$_2$—), trimethylene group (—CH$_2$CH$_2$CH$_2$—), tetra methylene group (—CH$_2$CH$_2$CH$_2$CH$_2$—), pentamethylene group (—CH$_2$CH$_2$CH$_2$CH$_2$CH$_2$—), and hexamethylene group (—CH$_2$CH$_2$CH$_2$CH$_2$CH$_2$CH$_2$—).

Of vinyl ethers represented by the above formula (1), concrete examples of the vinyl ether having one hydroxyl group include linear alkyl vinyl ether such as hydroxymethyl vinyl ether, 1-hydroxyethyl vinyl ether, 3-hydroxypropyl vinyl ether, 4-hydroxybutyl vinyl ether, and 5-hydroxypentyl vinyl ether; branched alkyl vinyl ether such as 1-hydroxyethyl vinyl ether, 1-hydroxypropyl vinyl ether, 2-hydroxypropyl vinyl ether, 2-hydroxy-1-methylethyl vinyl ether, 1-hydroxy-1-methylethyl vinyl ether, 1-hydroxybutyl vinyl ether, 2-hydroxybutyl vinyl ether, 3-hydroxybutyl vinyl ether, 3-hydroxy-1-methyl propyl vinyl ether, 3-hydroxy-2-methyl propyl vinyl ether, 2-hydroxy-2-methyl propyl vinyl ether, 2-hydroxy-1-methyl propyl vinyl ether, 1-hydroxymethyl propyl vinyl ether, 2-hydroxy-1,1-dimethylethyl vinyl ether, 1-hydroxy-2-methyl propyl vinyl ether, 4-hydroxyamyl vinyl ether, 3-hydroxyamyl vinyl ether, 2-hydroxyamyl vinyl ether, 4-hydroxy-3-methyl butyl vinyl ether, and 3-hydroxy-3-methyl butyl ether;
monocyclic cycloalkyl vinyl ether such as 2-hydroxy cyclopentyl vinyl ether, 3-hydroxy cyclopentyl vinyl ether, 2-hydroxy cyclohexyl vinyl ether, 3-hydroxy cyclohexyl vinyl ether, 4-hydroxy-cyclohexyl vinyl ether, 4-(hydroxymethyl)cyclohexyl vinyl ether, 4-(2-hydroxyethyl) cyclohexyl vinyl ether, 2-hydroxy cycloheptyl vinyl ether, 2-hydroxy cyclooctyl vinyl ether, 4-hydroxy cyclooctyl vinyl ether, and 2-hydroxy cyclodecanyl vinyl ether;
polycyclic cycloalkyl vinyl ether such as 3-hydroxy-1-vinyl oxyadamantane, bicyclo[2.2.1]heptanediol monovinyl ether, tricyclo[5.2.1.0$^{2,6}$]decanediol monovinyl ether, and decalindiol monovinyl ether; and alkoxy vinyl ether such as 2-hydroxy-1-methoxyethyl vinyl ether, 1-hydroxy-2-methoxyethyl vinyl ether, 2-(hydroxy methoxy)ethyl vinyl ether, 1-(hydroxy methoxy)ethyl vinyl ether, diethylene glycol vinyl ether, dipropylene glycol vinyl ether, 3-hydroxy-1-methoxypropyl vinyl ether, 3-hydroxy-1-ethoxypropyl vinyl ether, 4-hydroxy-1-ethoxybutyl vinyl ether, 2-(2-hydroxyethyl)-1-methylethyl vinyl ether, 4-hydroxy-3-vinyl oxytetrahydrofuran, 4-hydroxy-2-vinyl oxytetrahydrofuran, and 4-hydroxy-2-vinyl oxytetrahydropyran.

Examples of vinyl ether having two hydroxyl groups include trivalent alcohol monovinyl ether such as glycerin, 1,2,3-butanetriol, 1,2,4-butanetriol, 2-methyl-1,2,3-propanetriol, 1,2,3-pentanetriol, 1,2,4-pentanetriol, 1,3,5-pentanetriol, 2,3,4-pentanetriol, 2-methyl-2,3,4-butanetriol, trimethylolethane, 2,3,4-hexanetriol, 2-ethyl-1,2,3-butanetriol, trimethylolpropane, 4-propyl-3,4,5-heptanetriol, and 2,4-dimethyl-2,3,4-pentanetriol.

Examples of vinyl ether having three hydroxyl groups include tetravalent alcohol monovinyl ether such as erythritol, pentaerythritol, 1,2,3,4-pentatetrole, 2,3,4,5-hexatetrole, 1,2,4,5-pentanetetrole, 1,3,4,5-hexanetetrole, diglycerin, and sorbitan.

Examples of vinyl ether having four hydroxyl groups include pentavalent alcohol monovinyl ether such as adonitol, arabinitol, xylitol, and triglycerin.

Examples of vinyl ether having five hydroxyl groups include hexavalent alcohol monovinyl ether such as dipentaerythritol, sorbitol, mannitol, iditol, dulcitol, and inositol.

Of these vinyl ethers, the vinyl ether having one hydroxyl group is preferred in that it is easily obtained and synthesized in terms of high availability and easy synthesis. Of these, linear or branched alkyl vinyl ether and alkoxy alkyl vinyl ether are preferred in terms of radical polymerizability; hydroxymethyl vinyl ether, 2-hydroxyethyl vinyl ether, 3-hydroxypropyl vinyl ether, 4-hydroxybutyl vinyl ether, 5-pentyl vinyl ether, 3-hydroxy-2-methyl-propyl vinyl ether, 3-hydroxy-3-methyl propyl vinyl ether, diethylene glycol vinyl ether, dipropylene glycol vinyl ether and the like are more preferred; and 2-hydroxyethyl vinyl ether, 3-hydroxypropyl vinyl ether, 4-hydroxybutyl vinyl ether, and diethylene glycol vinyl ether are in particular preferred.

A monomer component used in the method of producing a vinyl ether copolymer according to the present invention may further comprise at least one type of vinyl ether represented by the following formula (2):

(wherein R2 represents an aliphatic hydrocarbon group having 2 to 20 carbon atoms, and may be branched or may comprise a cyclic structure),
or the following formula (3):

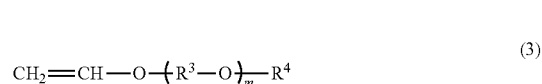

(wherein R3 represents a linear or branched hydrocarbon group having 1 to 4 carbon atoms; R4 represents a methyl group or an ethyl group; and m is 1 to 5).

That is, the vinyl ether copolymer may be obtained by polymerizing only the vinyl ether represented by the formula (1) and can be obtained by copolymerizing in conjunction with the vinyl ether represented by formula (2) or formula (3), or both of them.

In the above formula (2), examples of the aliphatic hydrocarbon group having 2 to 20 carbon atoms represented by $R^2$ include an alkyl group having 2 to 20 carbon atoms and an alicyclic hydrocarbon group having 3 to 20 carbon atoms. Examples of the alkyl group having 2 to 20 carbon atoms include linear alkyl groups such as an ethyl group, propyl group, n-butyl group, n-pentyl group, n-hexyl group, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, and n-eicosyl group; and branched alkyl groups such as an isopropyl group, sec-butyl group, tert-butyl group, isobutyl group, isoamyl group, isohexyl group, isoheptyl group, isooctyl group, 1,2-dimethylpropyl group, 1,3-dimethyl butyl group, 2-ethylbutyl group, 2-ethylhexyl group, 2-methyloctyl group, 1-pentylhexyl group, 1-methylheptyl group, and 4-ethyl-1-methyloctyl group.

Examples of the alicyclic hydrocarbon group having 3 to 20 carbon atoms include monocyclic alicyclic alkyl groups such as cyclopentyl group, cyclohexyl group, cyclopentyl group, cyclooctyl group, cyclononyl group, and cyclodecanyl group; alicyclic alkyl groups whose alkyl group is substituted such as 2-methylcyclopentyl group, 3-methylcyclopentyl group, 2-ethyl cyclopentyl group, 3-ethyl cyclopentyl group, 2-methylcyclohexyl group, 3-methylcyclohexyl group, 4-methylcyclohexyl group, 2-ethyl cyclohexyl group, 3-ethyl cyclohexyl group, and 4-ethyl cyclohexyl group; cycloalkyl alkyl groups such as cyclohexylmethyl group and 2-cyclohexylethyl group; and polycyclic alicyclic alkyl groups such as tricyclodecanyl group, 1-adamantyl group, bicyclo[2.2.1]heptyl group, tricyclo[5.2.1.0$^{2,6}$]decanyl group, and decahydronaphthyl group.

Of these aliphatic hydrocarbon groups, in terms of compatibility with hydroxyl group-containing vinyl ether and radical copolymerizability, a linear or branched alkyl group having 2 to 10 carbon atoms or a monocyclic alicyclic alkyl groups having 5 to 10 carbon atoms is more preferred.

Concrete examples of vinyl ether represented by the above formula (2) include linear alkyl vinyl ethers such as ethyl vinyl ether, propyl vinyl ether, n-butyl vinyl ether, n-pentyl vinyl ether, n-hexyl vinyl ether, n-heptyl vinyl ether, n-octyl vinyl ether, n-nonyl vinyl ether, n-decyl vinyl ether, n-undecyl vinyl ether, n-dodecyl vinyl ether, n-tridecyl vinyl ether, n-tetradecyl vinyl ether, n-pentadecyl vinyl ether, n-hexadecyl vinyl ether, n-heptadecyl vinyl ether, n-octadecyl vinyl ether, and n-eicosyl vinyl ether;

branched alkyl vinyl ethers such as isopropyl vinyl ether, sec-butyl vinyl ether, tert-butyl vinyl ether, isobutyl vinyl ether, isoamyl vinyl ether, isohexyl vinyl ether, isoheptyl vinyl ether, isooctyl vinyl ether, 1,2-dimethyl propyl vinyl ether, 1,3-dimethyl butyl vinyl ether, 2-ethylbutyl vinyl ether, 2-ethyl hexyl vinyl ether, 1-methylheptyl vinyl ether, 2-methyloctyl vinyl ether, 1-pentylhexyl vinyl ether, and 4-ethyl-1-methyloctyl vinyl ether; and monocyclic or polycyclic cycloalkyl vinyl ethers such as cyclopentyl vinyl ether, cyclohexyl vinyl ether, cycloheptyl vinyl ether, cyclooctyl vinyl ether, 4-methyl cyclohexyl vinyl ether, 4-ethyl cyclohexyl vinyl ether, 1-adamantyl vinyl ether, bicyclo[2.2.1]heptyl vinyl ether, and tricyclo[5.2.1.0$^{2,6}$]decanyl vinyl ether.

Of these vinyl ethers, preferred are linear or branched alkyl vinyl ethers having 2 to 10 carbon atoms such as ethyl vinyl ether, propyl vinyl ether, n-butyl vinyl ether, n-pentyl vinyl ether, n-hexyl vinyl ether, n-heptyl vinyl ether, n-octyl vinyl ether, isopropyl vinyl ether, sec-butyl vinyl ether, tert-butyl vinyl ether, isobutyl vinyl ether, isoamyl vinyl ether, isohexyl vinyl ether, isoheptyl vinyl ether, isooctyl vinyl ether, 1,3-dimethyl butyl vinyl ether, 2-ethylbutyl vinyl ether, 2-ethyl hexyl vinyl ether, and 1-methylheptyl vinyl ether; and monocyclic cycloalkyl vinyl ethers having 5 to 10 carbon atoms such as cyclopentyl vinyl ether, cyclohexyl vinyl ether, cycloheptyl vinyl ether, and cyclooctyl vinyl ether.

Further, in the above formula (3), examples of a hydrocarbon group having a linear or branched chain with 1 to 4 carbon atoms represented by $R^3$ include a linear alkylene group such as methylene ($-CH_2-$), ethylene ($-CH_2CH_2-$), trimethylene ($-CH_2CH_2CH_2-$), and tetramethylene ($-CH_2CH_2CH_2CH_2-$); and a branched alkylene group such as ethylidene [$-CH(CH_3)-$], propylene [$-CH(CH_3)CH_2-$], propylidene [$-CH(CH_3CH_2)-$], and isopropylidene [$-C(CH_3)_2-$].

Of these, the linear alkylene group such as methylene, ethylene, trimethylene, and tetramethylene; and the branched alkylene group such as propylene and propylidene are preferred; and ethylene, trimethylene, tetramethylene, propylene, and propylidene are in particular preferred. Further, $R^3$ may be one kind or may be two or more kinds.

The average molar number of groups added, m, wherein the group is represented by ($R^3O$) in the above formula (3), is within the range of 1 to 5, more preferably within the range of 1 to 4, and still more preferably within the range of 1 to 3.

Concrete examples of the vinyl ether represented by the above formula (3) include 2-methoxyethyl vinyl ether, 2-ethoxyethyl vinyl ether, 3-methoxypropyl vinyl ether, 3-ethoxypropyl vinyl ether, 3-ethoxybutyl vinyl ether, methyldiethylene glycol vinyl ether, ethyldiethylene glycol vinyl ether, methyltriethylene glycol vinyl ether, methyltetraethylene glycol vinyl ether, and methylpentaethylene glycol vinyl ether. These vinyl ethers are all hydrophilic, and all exhibit a suitable reactivity in a radical polymerization reaction with a hydroxyl group-containing vinyl ether; but 2-methoxyethyl vinyl ether, 2-ethoxyethyl vinyl ether, methyldiethylene glycol vinyl ether, ethyl diethylene glycol vinyl ether, methyltriethylene glycol vinyl ether and the like can suitably be employed in terms of ease of obtaining the monomer.

In cases where a hydroxyl group-containing vinyl ether represented by the formula (1) is copolymerized with a vinyl ether represented by the formula (2) or (3), the kind and composition ratio of monomers used can be appropriately selected depending on various characteristics required by a vinyl ether copolymer to be obtained. In accordance with the method of production according to the present invention, the composition ratio of the hydroxyl group-containing vinyl ether (in the case of using two or more hydroxyl group-containing vinyl ethers, the total amount thereof) can be selected from a broad range of 10 to 99 mol % based on all monomers. It is to be noted that from the viewpoint of a radical reactivity, the proportion of the hydroxyl group-containing vinyl ether (in the case of using two or more hydroxyl group-containing vinyl ethers, the total amount thereof) is preferably in a range of 10 to 99 mol % based on all monomers, more preferably in a range of 15 to 99 mol %, and in particular preferably in a range of 20 to 99 mol %. If the proportion of the hydroxyl group-containing vinyl ether is not less than 10 mol %, sufficient radical polymerizability can be attained to render high molecular weight.

Vinyl Ether (Co)Polymer

According to the method of production according to the present invention, contrary to conventional knowledge, it is possible to obtain vinyl ether (co)polymers with high molecular weight by radical polymerization. The obtained vinyl ether (co)polymer preferably has a weight average molecular weight (Mw) within the range of 1000 to 100000, more preferably within the range of 3000 to 50000, and still more preferably within the range of 5000 to 30000, wherein the weight average molecular weight is measured in terms of polystyrene by a gel permeation chromatography (GPC) method. Further, the obtained vinyl ether (co)polymer preferably has a molecular weight distribution (Mw/Mn) within the range of 1.0 to 5.0, more preferably in the range of 1.0 to 4.0, and still more preferably in the range of 1.2 to 3.0.

In the method of production according to the present invention, the rate of polymerization (that is, the conversion of the monomer) in a polymerization reaction is preferably not less than 10%, more preferably not less than 20%, and still more preferably not less than 30%. In cases where the monomer component includes plural monomers, it is preferred that the conversion of each of the monomers be all within the above range.

According to the method of production according to the present invention, generation of polyacetal can be inhibited. For instance, the content of polyacetal generated in a (co) polymer is preferably not more than 10% by weight, more preferably not more than 5% by weight, and still more preferably not more than 1% by weight. Further, it is preferred that the (co)polymer do not contain polyacetal substantially.

Oil-soluble Radical Polymerization Initiator

An oil-soluble radical polymerization initiator is not particularly restricted as long as it is oil-soluble and is a radical polymerization initiator for initiating radical polymerization; and one that has been conventionally known can be used. It is preferred that the above oil-soluble radical polymerization initiator be insoluble or poorly soluble in water (the solubility to water at 23° C. is preferably not more than 10% by weight and more preferably not more than 5% by weight). As the oil-soluble radical polymerization initiator, an organic peroxide or organic azo compound is in particular preferably used.

Examples of the organic peroxide include ketone peroxides such as methyl ethyl ketone peroxide, methyl isobutyl ketone peroxide, and cyclohexanone peroxide; diacyl peroxides such as benzoyl peroxide, decanoyl peroxide, and lauroyl peroxide; dialkyl peroxides such as dicumyl peroxide, t-butyl cumyl peroxide, and di-t-butyl peroxide; peroxy ketals such as 1,1-di(t-hexylperoxy)-3,3,5-trimethyl cyclohexane, 1,1-bis(t-hexylperoxy)cyclohexane, 1,1-di-t-butyl peroxy cyclohexane, and 2,2-di(t-butyl peroxy)butane; alkyl peroxyesters such as t-butyl peroxypivalate, t-butyl peroxy-2-ethyl hexanoate, t-butyl peroxy isobutyrate, di-t-butyl peroxyhexahydroterephthalate, di-t-butyl peroxyazelate, t-butyl peroxy-3,5,5-trimethyl hexanoate, t-hexylperoxy-2-ethyl hexanoate, 1,1,3,3-tetra methyl butyl peroxy-2-ethyl hexanoate, t-butyl peroxyacetate, t-butyl peroxybenzoate, di-t-butyl peroxytrimethyl adipate, t-hexyl peroxy isopropyl monocarbonate, t-butyl peroxylaurate, and t-hexylperoxybenzoate; and peroxycarbonates such as diisopropyl peroxydicarbonate, di-sec-butyl peroxydicarbonate, and t-butyl peroxyisopropyl carbonate.

Examples of the organic azo compound include azonitrile compounds such as 2,2'-azobisisobutyron itrile, 2,2'-azobis(2-methylbutyronitrile), 2,2'-azobis(2,4-dimethylvaleronitrile), 2,2-azobis(4-methoxy-2,4-dimethylvaleronitrile), 1,1'-azobis(cyclohexane-1-carbonitrile); azoester compounds such as dimethyl-2,2'-azobis isobutyrate; azo amide compounds such as 2,2'-azobis[2-(3,4,5,6-tetrahydropyrimidine-2-yl)propane]dihyd rochloride, 2,2'-azobis{2-methyl-N-[1,1-bis(hydroxymethyl)-2-hydroxyeth yl]-propionamide, 2,2'-azobis[2-methyl-N-(2-hydroxyethyl)-propionamide], and 2,2'-azobis[N-(2-propenyl)-2-methylpropionamide]; and 2,2'-azobis(2,4,4-trimethyl pentane).

Of these oil-soluble radical polymerization initiators, an organic azo compound is preferred in terms of molecular weight reproducibility; an azonitrile compound and azoester compound are more preferred in terms of inhibition of a side reaction; and the azoester compound is in particular preferred in that toxic cyano is not taken into a polymer.

The ten-hour half-life temperature of an oil-soluble radical polymerization initiator is preferably not more than 100° C. If the ten-hour half-life temperature is not more than 100° C., it is easy to prevent the radical polymerization initiator from being remained at the time of the completion of reaction. The polymerization initiator may be solely used; or two or more polymerization initiator may be mixed to use.

Because the amount of the oil-soluble radical polymerization initiator used varies depending on reaction temperature or the composition ratio of each monomer, it cannot be unconditionally confined; and the amount is preferably 0.1 to 10 parts by weight based on total 100 parts by weight of radical polymerizable monomers and in particular preferably 1.0 to 5 parts by weight. If the amount of the oil-soluble radical polymerization initiator added is not less than 0.1 parts by weight, the polymerization reaction is allowed to sufficiently proceed; and if the amount is not more than 10 parts by weight, a decrease in the molecular weight of the generated polymer can be prevented and the cost can be reduced as well.

Polymerization Solvent

In accordance with the method of production according to the present invention, the polymerization reaction may be carried out in the absence of a solvent; or a solvent that does not react with a substrate, forms a hydrogen bond with a monomer, and has a small chain transfer constant may be used. As such a solvent, water or a water-soluble organic solvent can be used; and, particularly in cases where copolymerization with a hydrophobic monomer is carried out, it is preferred to use the water-soluble organic solvent. As the water-soluble organic solvent, alcohol, alkyl amide, alkyl sulfoxide, ketone, and the like can suitably be used.

Examples of the alcohol include monoalcohols such as methanol, ethanol, isopropanol, n-butyl alcohol, isobutyl alcohol, tert-butyl alcohol, sec-butyl alcohol, and tetrahydrofurfuryl alcohol; polyalcohols such as ethylene glycol, glycerin, and diethylene glycol; ether alcohols such as methyl cellosolve, cellosolve, isopropyropyl cellosolve, butyl cellosolve, ethylene glycol monomethyl ether, ethylene glycol monoethyl ether, diethylene glycol monomethyl ether, and diethylene glycol monoethyl ether.

Examples of the alkyl amide include dimethylformamide, dimethylacetamide, and N-methylpyrrolidone. Examples of the alkyl sulfoxide include dimethyl sulfoxide. Examples of the ketone include acetone and methyl ethyl ketone. These solvents may be solely used or two or more solvents may be mixed to use.

Of these, from the viewpoint of ease of handling at the time of the production and radical polymerizability, monoalcohols are preferred; methanol, ethanol, and isopropanol are more preferred; and methanol is in particular preferred.

In cases where a polymerization solvent is used, the amount of the solvent used is preferably in a range of 10 to 80% by weight and in particular preferably in a range of 10 to 50% by weight. If the proportion of the polymerization solvent is not more than 80% by weight, a sufficient radical polymerizability can be attained; a decrease in rate of polymerization can be prevented; and a decrease in the molecular weight of the generated polymer can be prevented.

Polymerization Step

In accordance with the method of production according to the present invention, a reaction temperature in the polymerization step (polymerization temperature) may only to be appropriately selected depending on the kind of polymerization initiator; and the reaction (polymerization) may be carried out by changing the temperature stepwise. In general, it is preferably in a range of 50 to 180° C. and in particular preferably 60 to 170° C. If the reaction temperature is 50° C. or higher, deterioration of the reaction is prevented and if the reaction temperature is 180° C. or lower, degradation of an oil-soluble radical polymerization initiator can be prevented and a decrease in the molecular weight of the generated polymer ascribed to increased chain transfer can be prevented.

A method of polymerization is not particularly restricted; and the polymerization can be for example initiated by preparing in advance a monomer, a polymerization initiator, and as necessary a polymerization solvent in a reactor and increasing the temperature. Further, the polymerization may be initiated by adding a polymerization initiator to a monomer or monomer solution that has been heated. The polymerization initiator may be sequentially added or may be added all at once. Further, by combining these, a part of polymerization initiator may be in advance prepared in a reactor and then the remaining may be sequentially added to the reaction system. In the case of sequential addition, operations become complicated but the polymerization reaction is easy to control.

Further, in cases where there is a concern about temperature rise due to generation of heat, or in cases where the reaction rates of plural monomers greatly vary, the monomer or monomer solution may be dividedly or continuously added. In this occasion, the temperature may be increased to the reaction temperature at the time when a part of monomer or monomer solution is added to a reactor and the remaining may be then dividedly or continuously added; or a solvent may be in advance prepared in a reactor and the monomer or monomer solution may be divided or continuously added to the solvent that has been heated. Further, a polymerization initiator may be in advance prepared in a reactor, may be added into the system in conjunction with a monomer or separately; or a part of polymerization initiator may be in advance prepared in a reactor and then the remaining may be sequentially added into the reaction system. Such a method is able to inhibit a temperature rise ascribed to generation of heat and therefore the polymerization (reaction) is easy to control.

A status of progress of the polymerization reaction can be tracked by a status of generation of heat, measurement of the amount of the remaining monomer, or the like. In cases where a large amount of the monomer remains, after the reaction matures, the polymerization initiator can be further added to decrease the residual amount.

After the completion of the reaction, the generated homopolymer or copolymer of hydroxyl group-containing vinyl ether is subjected to aftertreatment by a known operation, treatment method (for example, neutralization, solvent extraction, wash with water, solvent extraction, solvent distillation, reprecipitation, and the like) to isolate.

EXAMPLES

By way of the examples and comparative examples, the present invention will be described in more detail below; however the present invention is not interpreted by being limited to the content of the following examples.

Evaluation of the physical property of homopolymers and copolymers that were obtained in the Examples was carried out by the following methods.

1) Structure analysis of homopolymer, a rate of polymerization, and composition analysis of copolymer were carried out using $^1$H NMR or $^{13}$C NMR.

(1)$^1$H NMR: Samples were dissolved in deuterium oxide or deuterated chloroform to measure using JMN AL-300 (manufactured by JEOL Ltd.).

(2)$^{13}$C NMR: Samples were dissolved in deuterated methanol to measure using JMN LA-500 (manufactured by JEOL Ltd.).

2) Analysis of weight average molecular weight (Mw) and molecular weight distribution (Mw/Mn) of the homopolymer and copolymer was carried out using gel permeation chromatography (GPC).

Condition 1 (Homopolymer and HBVE/HEVE Copolymer)

Column: TSK gel column G-MHHR-M×2 (manufactured by Tosoh Corporation)

or Shodex GPC KD804×3 (manufactured by Showa Denko K.K.)

Solvent: dimethylformamide (containing 10 mmol/L lithium bromide)

Measurement temperature: 40° C.

Flow rate: LO ml/min

Standard curve: standard polystyrene standard

Condition 2 (Other Copolymers)

Column: Shodex GPC LF804×3 (manufactured by Showa Denko K.K.)

Solvent: tetrahydrofuran

Measurement temperature: 40° C.

Flow rate: 1.0 ml/min

Standard curve: standard polystyrene standard

Example 1

Production of Poly Hydroxyethyl Vinyl Ether (Bulk Polymerization, Oil-Soluble Radical Polymerization Initiator AIBN)

To a test tube, a stirring bar, 5.40 g (61.4 mmol) of hydroxyethyl vinyl ether (manufactured by Maruzen Petrochemical Co., Ltd., hereinafter, referred to as "HEVE"), and 0.020 g (0.12 mmol, 0.2 mol % for a monomer) of 2,2'-azobisisobutyronitrile (manufactured by Wako Pure Chemical Industries, Ltd. "V-60", hereinafter, referred to as "AIBN") were added, and capped with a rubber septum cap. While stirring, two injection needles were stuck from the upper part of the septum cap and dry nitrogen was blown through one of them to bubble while stirring for 20 minutes. The injection needles were then taken out. The test tube was put in an oil thermostat bath that had been in advance heated at 70° C., and heated while stirred for 16 hours to polymerize. After the completion of the polymerization, the septum cap was removed; and a polymerization vessel was cooled with ice water to terminate the polymerization, thereby obtaining poly hydroxyethyl vinyl ether (hereinafter, referred to as "PHEVE"). The obtained PHEVE was dialyzed by a dialysis membrane with a molecular cut off of 1000 Daltons using pure water to obtain a transparent and colorless liquefied polymer. The rate of polymerization of HEVE (that is, the conversion of the monomer) was 37% with Mw=31600 and Mw/Mn=2.82.

<Comparison with PHEVE by Living Cationic Polymerization Method>

In accordance with Non-patent Document 1, poly (2-(tert-butyldimethylsilyloxy))ethyl vinyl ether was desilylated to synthesize PHEVE by a living cationic polymerization method. When the structure of this PHEVE obtained by the living cationic polymerization method and PHEVE synthesized by Example 1 were compared using the result of $^1$H NMR analysis, peaks were observed at the same site. From this, it was confirmed that PHEVE was generated also in Example 1.

Further, the fine structure (stereoregularity) of PHEVE obtained by the living cationic polymerization method and PHEVE obtained in Example 1 was measured by $^{13}$C NMR measurement. In PHEVE synthesized by the living cationic polymerization method of Non-patent Document 1, a ratio between meso and racemo that was obtained from a signal derived from methylene groups in the main chain exhibited meso:racemo=67:33 whereas PHEVE obtained in Example 1 exhibited meso:racemo=51:49; and it was thus confirmed that the fine structure of PHEVE obtained by the present invention is different from that of PHEVE obtained by the living cationic method (that is, a mode of polymerization was different).

Example 2

Production of Poly Hydroxybutyl Vinyl Ether (1) (Bulk Polymerization, Oil-soluble Radical Polymerization Initiator AIBN)

To a test tube, a stirring bar, 7.10 g (61.2 mmol) of hydroxybutyl vinyl ether (manufactured by Maruzen Petrochemical Co., Ltd., hereinafter, referred to as "HBVE"), and 0.020 g (0.12 mmol, 0.2 mol % for a monomer) of "AIBN" were added, and capped with a rubber septum cap. While stirring, two injection needles were stuck from the upper part of the septum cap and dry nitrogen was blown through one of them to bubble while stirring for 20 minutes. The injection needles were then taken out, the test tube was put in an oil thermostat bath that had been in advance heated at 70° C., and heated while stirred for 48 hours to polymerize. After the completion of the polymerization, the septum cap was removed; and a polymerization vessel was cooled with ice water to terminate the polymerization, thereby obtaining poly hydroxybutyl vinyl ether (hereinafter, referred to as "PHBVE"). The obtained PHBVE was dialyzed by a dialysis membrane with a molecular cut off of 1000 Daltons using pure water to obtain a transparent and colorless liquefied polymer. The rate of polymerization of HBVE (that is, the conversion of the monomer) was 33% with Mw=23200 and Mw/Mn=1.66.

<Comparison with PHBVE by Living Cationic Polymerization Method>

In accordance with Non-patent Document 1, poly (4-(tert-butyldimethylsilyloxy))butyl vinyl ether was desilylated to synthesize PHBVE by a living cationic polymerization method. When the structure of this PHBVE obtained by the living cationic polymerization method and PHBVE synthesized by Example 1 were compared using the result of $^1$H NMR analysis, peaks were observed at the same site. From this, it was confirmed that PHBVE was generated also in Example 2.

Example 3

Production of Poly Hydroxybutyl Vinyl Ether (2) (Bulk Polymerization, Change in the Amount of AIBN)

PHBVE was synthesized in the same manner as described in Example 2 except that the amount of AIBN was 0.20 g (1.2 mmol, 2 mol % for a monomer). The rate of polymerization of HBVE was 65% with Mw=5400 and Mw/Mn=1.81.

Example 4

Production of Poly Hydroxybutyl Vinyl Ether (3) (Solvent Water, Oil-soluble Radical Polymerization Initiator AIBN)

PHBVE was synthesized in the same manner as described in Example 2 except that the same amount (mass ratio) of water as that of HBVE was added. The rate of polymerization of HBVE was 37% with Mw=29400 and Mw/Mn=1.73.

Example 5

Production of HEVE/HBVE Copolymer

Both monomers of HEVE and HBVE were adjusted to a molar ratio of 0:100, 10:90, 15:85, 20:80, 25:75, 30:70, and 40:60 and radical bulk polymerization by AIBN (0.2 mol % for the total amount of monomers) was carried out by the same method as that described in Example 1. When the composition of the polymer was determined by $^1$H NMR measurement, HBVE and HEVE were, in all cases, introduced at a ratio that is almost the same as the preparation ratio and thus it is confirmed that the reactivity of HBVE and HEVE was almost the same and the random copolymer was obtained.

<Cloud Point Measurement of HEVE/HBVE Random Copolymer>

The obtained polymer was dissolved in water to be 1.0% by weight; and the temperature of the aqueous solution was changed from 10° C. to 90° C. (increase in temperature) or the temperature of the aqueous solution was changed from 90° C. to 10° C. (decrease in temperature) to measure the cloud point thereof. The results are shown in Table 1.

TABLE 1

| HEVE/HBVE (molar ratio) | Cloud point (° C.) | |
|---|---|---|
| | At the time of increase in temperature | At the time of decrease in temperature |
| 0/100 | 44.4 | 44.5 |
| 10/90 | 52.2 | 53.1 |
| 15/85 | 57.0 | 56.7 |
| 20/80 | 61.1 | 59.9 |
| 25/75 | 66.4 | 65.6 |
| 30/70 | 70.9 | 71.2 |
| 40/60 | 74.6 | 78.3 |

As shown in Table 1, it turns out that the HBVE homopolymer and HEVE/HBVE random copolymer are both thermal stimulation responsive polymers whose hydrophilicity and hydrophobicity reversibly change at a specific temperature. Further, the response temperature can be optionally controlled by changing the composition ratio of the copolymer.

Example 6

Production of Poly Diethylene Glycol Monovinyl Ether

Poly diethylene glycol monovinyl ether was obtained in accordance with the same procedure as described in Example 2 except that 8.10 g of diethylene glycol monovinyl ether (manufactured by Maruzen Petrochemical Co., Ltd., hereinafter, referred to as "DEGVE") was used as a monomer. The rate of polymerization of DEGVE was 39% with Mw=85000 and Mw/Mn=3.13.

Comparative Example 1

Production of PHBVE by Water-soluble Azoinitiator (1) (Bulk Polymerization, Water-soluble Radical Polymerization Initiator V-501)

Polymerization was carried out by the same procedure as that described in Example 2 except that 0.034 g (0.12 mmol, 0.2 mol % for a monomer) of 4,4'-azobis(4-cyanovaleric acid)(manufactured by Wako Pure Chemical Industries, Ltd."V-501") was used as a polymerization initiator. The obtained polymer was PHBVE that contains about 40% by weight polyacetal; and the rate of polymerization of a mixture of PHBVE and polyacetal was 48% with Mw=29500 and Mw/Mn=1.64.

Comparative Example 2

Production of PHBVE by Water-soluble Azoinitiator (2) (Bulk Polymerization, Water-soluble Radical Polymerization Initiator VA-044)

Polymerization was carried out by the same procedure as that described in Example 2 except that 0.040 g (0.12 mmol, 0.2 mol % for a monomer) of 2,2'-azobis[2-(2-imidazoline-2-yl)propane]dihydrochloride (manufactured by Wako Pure Chemical Industries, Ltd."VA-044") was used as a polymerization initiator; but PHBVE was not obtained and polyacetal was selectively obtained. The rate of polymerization thereof was 100% with Mw=3500 and Mw/Mn=1.66.

Example 7

Production of Poly Hydroxybutyl Vinyl Ether (4) (Bulk Polymerization, Oil-soluble Radical Polymerization Initiator V-601)

A glass vessel with a three-way stopcock attached was provided; and 91.42 g (787.0 mmol) of HBVE and, as a polymerization initiator, 1.8034 g (7.84 mmol, 1 mol % for a monomer) of dimethyl-2,2'-azobis isobutyrate (manufactured by Wako Pure Chemical Industries, Ltd. "V-601") were added in the vessel to carry out polymerization at 70° C. for 8 hours. The remaining monomer was removed by drying under reduced pressure to obtain PHBVE (HBVE conversion ratio 77.5%, Mw=78000, Mw/Mn=1.59).

Example 8

Production of Poly Hydroxybutyl Vinyl Ether (5) (Bulk Polymerization, Oil-soluble Radical Polymerization Initiator V-59)

PHBVE was obtained by the same procedure as that described in Example 7 except that the polymerization initiator was changed to 2,2'-azobis(2-methyl isobutyronitrile) (manufactured by Wako Pure Chemical Industries, Ltd. "V-59") (HBVE conversion ratio 35.0%, Mw=75000, Mw/Mn=1.52).

Example 9

Production of Poly Hydroxybutyl Vinyl Ether (5) (Solvent Methanol, Oil-soluble Radical Polymerization Initiator 1 Mol %)

A glass vessel with a three-way stopcock attached was provided; and 68.25 g (587.6 mmol) of HBVE and 17.82 g of methanol were added in the vessel and heated. After the inside temperature reached 70° C., a solution obtained by dissolving 1.3393 g (5.82 mmol, 1 mol % for a monomer) of "V-601" in 11.91 g of methanol was dropped thereto over 1 hour and stirred at 70° C. for 8 hours. 70.58 g of methanol was added and the content was cooled to room temperature. Extraction was carried out three times with 168.8 g of hexane to remove the remaining monomers and polymerization initiator residues. The solvent was then removed under reduced pressure to obtain PHBVE (HBVE conversion ratio 56.7%, Mw=43000, Mw/Mn=1.35).

Example 10

Production of Poly Hydroxybutyl Vinyl Ether (6) (Solvent Methanol, Oil-soluble Radical Polymerization Initiator 5 Mol %)

PHBVE was obtained by the same procedure as that described in Example 9 except that the ratio of "V-601" was changed to 5 mol % for a monomer (HBVE conversion ratio 91.6%, Mw=42000, Mw/Mn=1.24).

Example 11

Production of hydroxybutyl vinyl ether/isobutyl Vinyl Ether Copolymer (1) (HBVE/IBVE=5/5) (Solvent Methanol, Oil-soluble Radical Polymerization Initiator 1 Mol %)

A glass vessel with a three-way stopcock attached was provided; and 35.53 g (305.9 mmol) of HBVE, 29.42 g (293.6 mmol) of isobutyl vinyl ether (manufactured by Tokyo Chemical Industry Co., Ltd., hereinafter, referred to as "IBVE"), 26.16 g of methanol, and 1.3801 g (6.00 mmol, 1 mol % for a monomer) of "V-601" were added in the vessel and stirred at reflux for 8 hours. 69.89 g of methanol was added and the content was cooled to room temperature. Extraction was carried out three times with 65 g of hexane to remove the remaining monomers and polymerization initiator residues. The solvent was then removed under reduced pressure to obtain a transparent and colorless liquefied polymer. The obtained polymer exhibited Mw=7500, Mw/Mn=1.56, and the composition ratio HBVE/IBVE=48.5/51.5 (HBVE conversion ratio 37.8%, IBVE conversion ratio 40.1%).

Example 12

Production of Hydroxybutyl Vinyl Ether/Isobutyl Vinyl Ether Copolymer (2) (IBVE/IBVE=7/3) (Solvent Methanol, Oil-soluble Radical Polymerization Initiator 1 Mol %)

A transparent and colorless liquefied polymer was obtained by the same procedure as that described in Example 11 except that the ratio between HBVE and IBVE was changed to 7/3 (molar ratio). The obtained polymer exhibited Mw=8900, Mw/Mn=1.59, and the composition ratio HBVE/IBVE=64.1/35.9 (HBVE conversion ratio 50.4%, IBVE conversion ratio 65.9%).

Example 13

Production of Hydroxybutyl Vinyl Ether/Isobutyl Vinyl Ether Copolymer (3) (HBVE/IBVE=3/7) (Solvent Methanol, Oil-soluble Radical Polymerization Initiator 5 Mol %)

A glass vessel with a three-way stopcock attached was provided; and 21.79 g (187.6 mmol) of HBVE, 43.11 g (430.2 mmol) of IBVE, 21.16 g of methanol, and 7.0961 g (30.84 mol, 5 mol % for a monomer) of "V-601" were added in the vessel and stirred at reflux for 8 hours. The remaining monomers and polymerization initiator residues were removed by drying under reduced pressure to obtain a pale yellow and transparent liquefied polymer. The obtained polymer exhibited Mw=5200, Mw/Mn=1.64, and the composition ratio HBVE/IBVE=27.7/72.3 (HBVE conversion ratio 53.0%, IBVE conversion ratio 59.2%).

Example 14

Production of Hydroxybutyl Vinyl Ether/Isobutyl Vinyl Ether Copolymer (4) (HBVE/IBVE=5/5) (Solvent Methanol, Oil-soluble Radical Polymerization Initiator 5 Mol %)

A glass vessel with a three-way stopcock attached was provided; and 35.16 g (302.7 mmol) of HBVE, 30.36 g (303.0 mmol) of IBVE, 21.40 g of methanol, and 7.0162 g (30.49 mmol, 5 mol % for a monomer) of "V-601" were added in the vessel and stirred at 70° C. for 8 hours. 69.33 g of methanol was added and the content was cooled to room temperature. The polymerization liquid was dropped in 130 g of hexane and stirred for 30 minutes. The stirring was stopped and the supernatant was distillated to remove. 130 g of hexane was then added thereto and stirred for 30 minutes. The operation was repeated twice and the solvent was removed under reduced pressure to obtain a pale yellow and transparent liquefied polymer. The obtained polymer exhibited Mw=5600, Mw/Mn=1.62, and the composition ratio HBVE/IBVE=45.4/54.6 (HBVE conversion ratio 66.3%, IBVE conversion ratio 79.6%).

Example 15

Production of Hydroxybutyl Vinyl Ether/Isobutyl Vinyl Ether Copolymer (5) (HBVE/IBVE=5/5) (Solvent Isopropanol, Oil-soluble Radical Polymerization Initiator 1 Mol %)

A glass vessel with a three-way stopcock attached was provided; and 35.27 g (303.6 mmol) of HBVE, 29.64 g (295.8 mmol) of IBVE, 26.50 g of isopropanol, and 1.3868 g (6.03 mmol, 1 mol % for a monomer) of "V-601" were added in the vessel and stirred at 70° C. for 8 hours. The solvent, remaining monomers, polymerization initiator residues were then removed under reduced pressure to obtain a transparent and colorless liquefied polymer. The obtained polymer exhibited Mw=5700, Mw/Mn=1.67, and the composition ratio HBVE/IBVE=51.8/48.2 (HBVE conversion ratio 66.9%, IBVE conversion ratio 62.3%).

Example 16

Production of Hydroxybutyl Vinyl Ether/Isobutyl Vinyl Ether Copolymer (6) (HBVE/IBVE=5/5) (Solvent DMF, Oil-soluble Radical Polymerization Initiator 1 Mol %)

A glass vessel with a three-way stopcock attached was provided; and 36.25 g (312.1 mmol) of HBVE, 30.60 g (305.4 mmol) of IBVE, 28.13 g of dimethylformamide, and 1.4356 g (6.24 mmol, 1 mol % for a monomer) of "V-601" were added in the vessel and stirred at 70° C. for 8 hours. The obtained polymer exhibited Mw=5800, Mw/Mn=1.59, and the composition ratio HBVE/IBVE=51.1/48.9 (HBVE conversion ratio 52.6%, IBVE conversion ratio 50.4%).

Example 17

Production of Hydroxyethyl Vinyl Ether/Isobutyl Vinyl Ether Copolymer (1) (HEVE/IBVE=5/5) (Solvent Methanol, Oil-soluble Radical Polymerization Initiator 1 Mol %)

A glass vessel with a three-way stopcock attached was provided; and 30.13 g (342.0 mmol) of hydroxyethyl vinyl ether (manufactured by Maruzen Petrochemical Co., Ltd., hereinafter, referred to as "HBVE"), 34.23 g (342.0 mmol) of IBVE, 26.15 g of methanol, and 1.6073 g (6.98 mmol, 1 mol % for a monomer) of "V-601" were added in the vessel and stirred at reflux for 8 hours. The content was cooled to room temperature. Extraction was carried out with 64 g of hexane to remove the remaining monomers and polymerization initiator residues. The solvent was then removed under reduced pressure to obtain a transparent and colorless liquefied polymer. The obtained polymer exhibited Mw=8700, Mw/Mn=1.68, and the composition ratio HEVE/IBVE=47.5/52.5 (HEVE conversion ratio 59.7%, IBVE conversion ratio 66.0%).

Example 18

Production of Hydroxyethyl Vinyl Ether/Isobutyl Vinyl Ether Copolymer (2) (HEVE/IBVE=5/5) (Solvent Methanol, Oil-soluble Radical Polymerization Initiator 5 Mol %)

A glass vessel with a three-way stopcock attached was provided; and 30.71 g (348.5 mmol) of HEVE, 34.82 g (347.5 mmol) of IBVE, 20.85 g of methanol, and 8.0746 g (35.09 mmol, 5 mol % for a monomer) of "V-601" were added in the vessel and stirred at 70° C. for 8 hours. 70.14 g of methanol was added and the content was cooled to room temperature. The polymerization liquid was dropped in 130 g of hexane and stirred for 30 minutes. The stirring was stopped and the supernatant was distillated to remove. 130 g of hexane was then added thereto and stirred for 30 minutes. The solvent was removed under reduced pressure to obtain a pale yellow and transparent liquefied polymer. The obtained polymer exhibited Mw=5900, Mw/Mn=1.66, and the composition ratio HEVE/IBVE=49.8/50.2 (HEVE conversion ratio 82.2%, IBVE conversion ratio 83.0%).

Example 19

Production of Hydroxybutyl Vinyl Ether/2-Ethyl Hexyl Vinyl Ether Copolymer (HBVE/EHVE=5/5) (Solvent Methanol, Oil-soluble Radical Polymerization Initiator 5 Mol %)

A glass vessel with a three-way stopcock attached was provided; and 28.00 g (241.0 mmol) of HBVE, 37.57 g (240.0 mmol) of 2-ethyl hexyl vinyl ether (manufactured by Maruzen Petrochemical Co., Ltd., hereinafter, referred to as "EHVE"), 22.88 g of methanol, and 5.5780 g (24.24 mmol, 5 mol % for a monomer) of "V-601" were added in the vessel and stirred at 70° C. for 8 hours. 69.86 g of methanol was added and the content was cooled to room temperature. The polymerization liquid was dropped in 130 g of hexane and stirred for 30 minutes. The stirring was stopped and the supernatant was distillated to remove. The solvent was then removed under reduced pressure to obtain a pale yellow and transparent liquefied polymer. The obtained polymer exhibited Mw=4800, Mw/Mn=1.53, and the composition ratio HBVE/EHVE=54.1/45.9 (HBVE conversion ratio 78.8%, EHVE conversion ratio 66.8%).

Example 20

Production of Hydroxybutyl Vinyl Ether/Cyclohexyl Vinyl Ether Copolymer (HBVE/CHVE=5/5) (Solvent Methanol, Oil-soluble Radical Polymerization Initiator 1 Mol %)

A glass vessel with a three-way stopcock attached was provided; and 31.75 g (273.3 mmol) of HBVE, 34.50 g (273.4 mmol) of cyclohexyl vinyl ether (manufactured by Maruzen Petrochemical Co., Ltd., hereinafter, referred to as "CHVE"), 27.45 g of methanol, and 1.2716 g (5.53 mmol, 1 mol % for a monomer) of "V-601" were added in the vessel and stirred at 70° C. for 8 hours. 70.65 g of methanol was added and the content was cooled to room temperature. Extraction was carried out three times with 65 g of hexane to remove the remaining monomers and polymerization initiator residues. The solvent was then removed under reduced pressure to obtain a pale yellow and transparent liquefied polymer. The obtained polymer exhibited Mw=3700, Mw/Mn=1.55, and the composition ratio HBVE/CHVE=44.0/56.0 (HBVE conversion ratio 35.4%, CHVE conversion ratio 45.0%).

Example 21

Production of Hydroxybutyl Vinyl Ether/2-(2-(2-ethoxy)Ethoxy)Ethyl Vinyl Ether Copolymer (HBVE/EOEOVE=5/5) (Solvent Methanol, Oil-soluble Radical Polymerization Initiator 1 Mol %)

A glass vessel with a three-way stopcock attached was provided; and 28.92 g (249.0 mmol) of HBVE, 38.8 g (241.0 mmol) of 2-(2-(2-ethoxy)ethoxy)ethyl vinyl ether (manufactured by Maruzen Petrochemical Co., Ltd., hereinafter, referred to as "EOEOVE"), 27.63 g of methanol, and 1.1340 g (4.93 mmol, 1 mol % for a monomer) of "V-601" were added in the vessel and stirred at 70° C. for 8 hours. 73.35 g of methanol was added and the content was cooled to room temperature. Extraction was carried out three times with 93 g of hexane to remove the remaining monomers and polymerization initiator residues. The solvent was then removed under reduced pressure to obtain a transparent and colorless liquefied polymer. The obtained polymer exhibited Mw=8300, Mw/Mn=1.78, and the composition ratio HBVE/EOEOVE=47.5/52.4 (HBVE conversion ratio 49.2%, EOEOVE conversion ratio 54.3%).

Example 22

Production of Hydroxybutyl Vinyl Ether/Methyltriethylene Glycol Vinyl Ether Copolymer (1) (HBVE/TEGMeVE=5/5) (Solvent Methanol, Oil-soluble Radical Polymerization Initiator 1 Mol %)

A glass vessel with a three-way stopcock attached was provided; and 26.13 g (224.9 mmol) of HBVE, 41.30 g (217.4 mmol) of methyltriethylene glycol vinyl ether (manufactured by Maruzen Petrochemical Co., Ltd., hereinafter, referred to as "TEGMeVE"), 28.25 g of methanol, and 1.0360 g (4.50 mmol, 1 mol % for a monomer) of "V-601" were added in the vessel and stirred at 70° C. for 8 hours. 74.81 g of methanol was added and the content was cooled to room temperature. Extraction was carried out three times with 67 g of hexane to remove the remaining monomers and polymerization initiator residues. The solvent was then removed under reduced pressure to obtain a transparent and colorless liquefied polymer. The obtained polymer exhibited Mw=8600, Mw/Mn=1.66, and the composition ratio HBVE/TEGMeVE=52.0/48.0 (HBVE conversion ratio 59.1%, TEGMeVE conversion ratio 54.6%).

Example 23

Production of Hydroxybutyl Vinyl Ether/Methyltriethylene Glycol Vinyl Ether Copolymer (2) (HBVE/TEGMeVE=5/5) (Solvent Methanol, Oil-soluble Radical Polymerization Initiator 5 Mol %)

A glass vessel with a three-way stopcock attached was provided; and 26.26 g (226.1 mmol) of HBVE, 42.80 g (225.3 mmol) of TEGMeVE, 24.29 g of methanol, and 5.2189 g (22.68 mmol, 5 mol % for a monomer) of "V-601" were added in the vessel and stirred at 70° C. for 8 hours. 73.90 g of methanol was added and the content was cooled to room temperature. The polymerization liquid was dropped in 138 g of hexane and stirred for 30 minutes. The stirring was stopped and the supernatant was distillated to remove. 138 g of hexane was then added thereto and stirred for 30 minutes. The same operation was repeated twice and the solvent was then removed under reduced pressure to obtain a pale yellow and transparent liquefied polymer. The obtained polymer exhibited Mw=5700, Mw/Mn=1.77, and the composition ratio HBVE/TEGMeVE=50.8/49.2 (HBVE conversion ratio 81.3%, TEGMeVE conversion ratio 78.8%).

Comparative Example 3

Production of Poly Isobutyl Vinyl Ether (Solvent Methanol, Oil-soluble Radical Polymerization Initiator 5 Mol %)

A glass vessel with a three-way stopcock attached was provided; and 62.06 g (619.4 mmol) of IBVE, 26.03 g of methanol, and 1.4436 g (6.27 mmol, 1 mol % for a monomer) of "V-601" were added in the vessel and polymerized at reflux for 8 hours. The solvent was then distillated to remove under reduced pressure to obtain a pale yellow and transparent liquefied polymer. The obtained polymer exhibited the IBVE conversion ratio 7.0%, Mw=7490, and Mw/Mn=1.56.

As shown in Comparative examples 1 and 2, when the water-soluble radical polymerization initiator is used as a polymerization initiator, polyacetal is generated and poly vinyl ether cannot be obtained efficiently.

Further, as shown in Comparative example 3, when the radical polymerization of vinyl ether is carried out without using vinyl ether containing a hydroxyl group such as hydroxybutyl vinyl ether and hydroxyethyl vinyl ether, the rate of polymerization (the conversion of monomer) is very low and industrial productivity is low.

On the contrary, the method of production according to the present invention can efficiently produce a homopolymer or random copolymer of vinyl ether with an introduced hydroxyl group at a high conversion ratio by using a hydroxyl group-containing vinyl ether as an essential monomer component and by carrying out radical polymerization using an oil-soluble radical polymerization initiator to thereby inhibit the generation of polyacetal.

The invention claimed is:

1. A method of producing a homopolymer of a hydroxyl group-containing vinyl ether, said method comprising the step of polymerizing vinyl ether monomer components only, using an organic azo compound as an oil-soluble radical polymerization initiator in the absence or presence of a solvent, said monomer components consisting of a first hydroxyl group-containing vinyl ether, said first hydroxyl group-containing vinyl ether represented by the following formula (1):

$$CH_2=CH-O-R^1(-OH)_n \qquad (1)$$

wherein $R^1$ represents an aliphatic hydrocarbon group having 1 to 10 carbon atoms or an alkoxy alkyl group having 3 to 7 carbon atoms, which is optionally branched and optionally comprises a cyclic structure; and n is 1 to 5, wherein said homopolymer has a weight average molecular weight (Mw) within the range of 3000 to 100,000.

2. The method of production according to claim 1, wherein said homopolymer has a weight average molecular weight (Mw) within the range of 5000 to 100,000.

3. The method of production according to claim 1, wherein a content of polyacetal by-product is not more than 10% by weight.

4. The method of production according to claim 1, wherein said solvent is water or an organic solvent comprising at least one water-soluble organic solvent.

5. The method of production according to claim 3, wherein said water-soluble organic solvent is selected from the group consisting of alcohol, alkyl amide, alkyl sulfoxide and ketone.

6. The method of production according to claim 1, wherein said homopolymer is a thermal stimulation responsive polymer.

7. The method of production according to claim 1, wherein said polymerizing is carried out in the absence of a solvent.

8. The method of production according to claim 1, wherein said polymerizing is carried out in the presence of a polymerization solvent selected from the group consisting of water, methanol, ethanol and isopropanol.

9. The method of production according to claim 1, wherein said organic azo compound is 2,2'-azobisisobutyronitrile or dimethyl-2,2'-azobis isobutyrate.

* * * * *